(12) United States Patent
Kajihara et al.

(10) Patent No.: US 10,167,042 B2
(45) Date of Patent: Jan. 1, 2019

(54) CLUTCH CONTROL SYSTEM

(71) Applicant: HONDA MOTOR CO., LTD., Tokyo (JP)

(72) Inventors: Eisuke Kajihara, Wako (JP); Junya Ono, Wako (JP); Yoshinobu Shiomi, Wako (JP); Hiroyuki Kojima, Wako (JP); Yoshiaki Nedachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 15/084,634

(22) Filed: Mar. 30, 2016

(65) Prior Publication Data

US 2016/0288864 A1    Oct. 6, 2016

(30) Foreign Application Priority Data

Mar. 31, 2015  (JP) .................. 2015-074155

(51) Int. Cl.
| | |
|---|---|
| *B62K 23/06* | (2006.01) |
| *F16D 25/08* | (2006.01) |
| *F16D 29/00* | (2006.01) |
| *F16D 48/06* | (2006.01) |
| *G05G 1/04* | (2006.01) |
| *G05G 5/03* | (2008.04) |
| *B62M 25/08* | (2006.01) |
| *F16D 48/00* | (2006.01) |

(52) U.S. Cl.
CPC ............ *B62K 23/06* (2013.01); *B62M 25/08* (2013.01); *F16D 25/086* (2013.01); *F16D 29/005* (2013.01); *F16D 48/00* (2013.01); *F16D 48/06* (2013.01); *G05G 1/04* (2013.01); *G05G 5/03* (2013.01); *F16D 2025/081* (2013.01)

(58) Field of Classification Search
CPC ............ F16D 2025/081; F16D 25/086; F16D 29/055; F16D 48/06; F16D 2300/18; F16D 2500/1117; F16D 2500/3021; F16D 29/005; B62K 23/06; B62M 25/08; G05G 1/04; G05G 5/03
See application file for complete search history.

(56) References Cited

U.S. PATENT DOCUMENTS 8,011,489 B2 * 9/2011 Takeuchi .............. B60W 10/02
                                                         192/3.58
8,459,428 B2 * 6/2013 Hayakawa .............. F16D 23/12
                                                          192/30 W

FOREIGN PATENT DOCUMENTS

JP          5243315 B2     7/2013

* cited by examiner

*Primary Examiner* — Richard M Lorence
(74) *Attorney, Agent, or Firm* — Westerman, Hattori, Daniels & Adrian, LLP (57) ABSTRACT

To downsize the periphery of reaction force applying device of a clutch controller, and set operation load more freely, in a clutch control system that links the clutch controller and a clutch device electrically, an operation reaction force is applied to a clutch lever, from reaction force applying device that uses a spring as a reaction force generation source; the reaction force applying device includes multiple reaction force generation cylinders arranged parallel to one another; and the clutch lever has an input/output arm, which extends toward an input/output part of each of the multiple reaction force generation cylinders from the vicinity of a lever support shaft, to allow transmission of operating force and reaction force between the clutch lever and the reaction force applying device.

15 Claims, 7 Drawing Sheets

CLUTCH CONTROL SYSTEM

TECHNICAL FIELD

The present disclosure relates to a clutch control system.

BACKGROUND

Patent Document 1 (Japanese Patent No. 5243315) discloses that in a by-wire system which links a clutch lever and a clutch device electrically, a clutch control apparatus includes: an actuator for driving the clutch device; operation amount detection means for detecting an operation amount of the clutch lever; and an electronic control unit for controlling operation of the actuator on the basis of a detected value of the operation amount detection means.

SUMMARY

Patent Document 1 employs a configuration in which multiple springs are arranged in series, to create operation load of the clutch lever which is mechanically connected to the clutch device through hydraulic pressure, cable, or the like. However, when such a configuration is employed, reaction force applying means tends to become large, which may result in interference with peripheral parts or less freedom in arrangement.

In view of the foregoing, it is desirable to downsize the periphery of reaction force applying means of a clutch controller, and set operation load more freely, in a clutch control system that links the clutch controller and a clutch device electrically. In the following explanation of the exemplary embodiment, specific elements with their reference numerals are indicated by using brackets. These specific elements are presented as mere examples in order to facilitate understanding, and thus, should not be interpreted as any limitation to the accompanying claims.

A first aspect of the embodiments includes: a clutch device (8); a clutch controller (2) as a controller of the clutch device (8); an actuator (5) for driving the clutch device (8) according to operation of the clutch controller (2); operation amount detection means (3, 36) for detecting an operation amount of the clutch controller (2); and an electronic control unit (4) for controlling operation of the actuator (5) on the basis of a detected value of the operation amount detection means (3, 36), and is characterized in that: the clutch controller (2) is a clutch lever (2) supported so as to be rotatable around a rotary shaft (12); operation reaction force is applied to the clutch lever (2), from reaction force applying means (10, 10', 110, 210) that uses a spring (23, 28, 23', 28', 33, 43) as a reaction force generation source; the reaction force applying means (10, 10', 110, 210) includes multiple reaction force generation cylinders (21, 26, 21', 26', 31, 41) arranged parallel to one another; and the clutch lever (2) has an input/output arm (13), which extends toward an input/output part of each of the multiple reaction force generation cylinders (21, 26, 21' 26', 31, 41) from the vicinity of the rotary shaft (12), to allow transmission of operating force and reaction force between the clutch lever (2) and the reaction force applying means (10, 10', 110, 210).

A second aspect is characterized in that: the clutch lever (2) is attached to the front of a handlebar (9) of the vehicle by a clamp-type lever holder (11); and the multiple reaction force generation cylinders (21, 26, 21', 26', 31, 41) are provided in an upper and lower pair in front of the handlebar (9).

A third aspect is characterized in that: the input/output arm (13) has a lever side-input/output point (14a) for the clutch lever (2), and multiple cylinder side-input/output points (15a, 16a) for the respective multiple reaction force generation cylinders (21, 26, 21', 26', 31, 41); and arm lengths (S1, S2) between the lever side-input/output point (14a) and each of the multiple cylinder side-input/output points (15a, 16a) are the same.

A fourth aspect is characterized in that: each of the multiple reaction force generation cylinders (21, 26) has a cylinder body (22, 27) accommodating a spring (23, 28); the spring (23, 28) is a coil spring expanding and contracting in the axial direction of the cylinder body (22, 27); and of the multiple reaction force generation cylinders (21, 26), the cylinder body (22) and spring (23) of the upper reaction force generation cylinder (21) have shorter axial lengths than the cylinder body (27) and spring (28) of the lower reaction force generation cylinder (26).

A fifth aspect is characterized in that: each of the multiple reaction force generation cylinders (21', 26') has a cylinder body (22', 27') accommodating a spring (23', 28'); the spring (23', 28') is a coil spring expanding and contracting in the axial direction of the cylinder body (22', 27'); and the cylinder bodies (22', 27') and springs (23', 28') of the multiple reaction force generation cylinders (21', 26') have the same lengths in the axial direction.

A sixth aspect is characterized in that: each of the multiple reaction force generation cylinders (26, 41) has a cylinder body (27, 42) accommodating a spring (28, 43); the spring (28) of one reaction force generation cylinder (26) is a coil spring; and the spring (43) of the other reaction force generation cylinder (41) is a Belleville spring.

A seventh aspect is characterized in that: the operation amount detection means (3) is a potentiometer (3) arranged coaxially with the rotary shaft (12); a rotation detector (3a) of the potentiometer (3) is connected so as to be integrally rotatable with the rotary shaft (12); and the rotary shaft (12) is connected so as to be integrally rotatable with the clutch lever (2).

A eighth aspect is characterized in that: at least one of the multiple reaction force generation cylinders (26, 31, 41) includes a cylinder body (32, 42) accommodating a spring (33, 43), a piston (34, 44) accommodated in a retractable manner inside the cylinder body (32, 42), and an oil chamber (32a, 42c) formed inside the cylinder body (32, 42) and closed by the piston (34, 44); and the operation amount detection means (36) is a hydraulic pressure sensor (36) for detecting hydraulic pressure of oil filled in the oil chamber (32a, 42c), and detects hydraulic pressure generated by frontward and backward movement of the piston (34, 44) operated by the clutch lever (2).

A ninth aspect is characterized in that: an oil branching portion (32c) is provided in the middle of the cylinder body (32, 42); the oil branching portion (32c) communicates into the oil chamber (32a, 42c) through a communication hole (32b); and the hydraulic pressure sensor (36) is provided in the communication hole (32b).

A tenth aspect is characterized in that the hydraulic pressure sensor (36) is provided in the oil chamber (32a, 42c).

According to the above first aspect, in a system where the clutch lever and clutch device are linked electrically, multiple reaction force generation cylinders are provided parallel to each other to create operation load of the clutch device on the clutch lever. Hence, the reaction force applying means can be arranged more freely to downsize the periphery thereof, and a larger operation load can be generated.

That is, the periphery of the reaction force applying means of the clutch lever can be downsized, and operation load can be set more freely.

According to the second aspect, since the reaction force applying means including the upper and lower pair of reaction force generation cylinders is arranged in front of the handlebar with the clutch lever, the reaction force applying means is not arranged on the rear side (rider's side) of the handlebar, and on the front side of the handlebar, frontward projection of the reaction force applying means is suppressed, so that interference with peripheral parts can be prevented and freedom in arrangement can be ensured.

According to the third aspect, when transmitting power between the clutch lever and reaction force applying means through the input/output arm, the power can be inputted and outputted at the same lever ratio between the clutch lever and each of the reaction force generation cylinders, whereby load of the reaction force applying means can be set easily.

According to the fourth aspect, since the upper reaction force generation cylinder closer to the rider is formed shorter, the reaction force applying means can be made less recognizable while setting a large operation load. According to the fifth aspect, since the loads generated in the reaction force generation cylinders are the same, operation load can be set even easier, and cost can be reduced by part sharing.

According to the sixth aspect, since the Belleville spring is used in one reaction force generation cylinder, the axial length of the one reaction force generation cylinder can be suppressed for downsizing, and combination of the linear load characteristic of the coil spring and the nonlinear load characteristic of the Belleville spring can bring the load characteristic closer to that of the conventional configuration, which varies in stages.

According to the seventh aspect, since the lever support shaft is used as the shaft member continuous with the rotation detector of the potentiometer, and the lever support shaft is integrally rotatable with the clutch lever, the potentiometer can directly acquire the rotation angle of the clutch lever.

According to the eighth aspect, since the hydraulic pressure sensor, which detects hydraulic pressure generated at the time of oil compression by the piston and cylinder body, is used as the operation amount detection means, cost can be reduced by eliminating the expensive potentiometer, and also the load characteristic can be brought closer to that of the conventional configuration using hydraulic pressure.

According to the ninth and tenth aspects, a compact configuration can be achieved even when the hydraulic pressure sensor is provided.

DETAILED DESCRIPTION

Hereinafter, embodiments of the present application will be described with reference to the drawings.

First Embodiment

Figure 1:
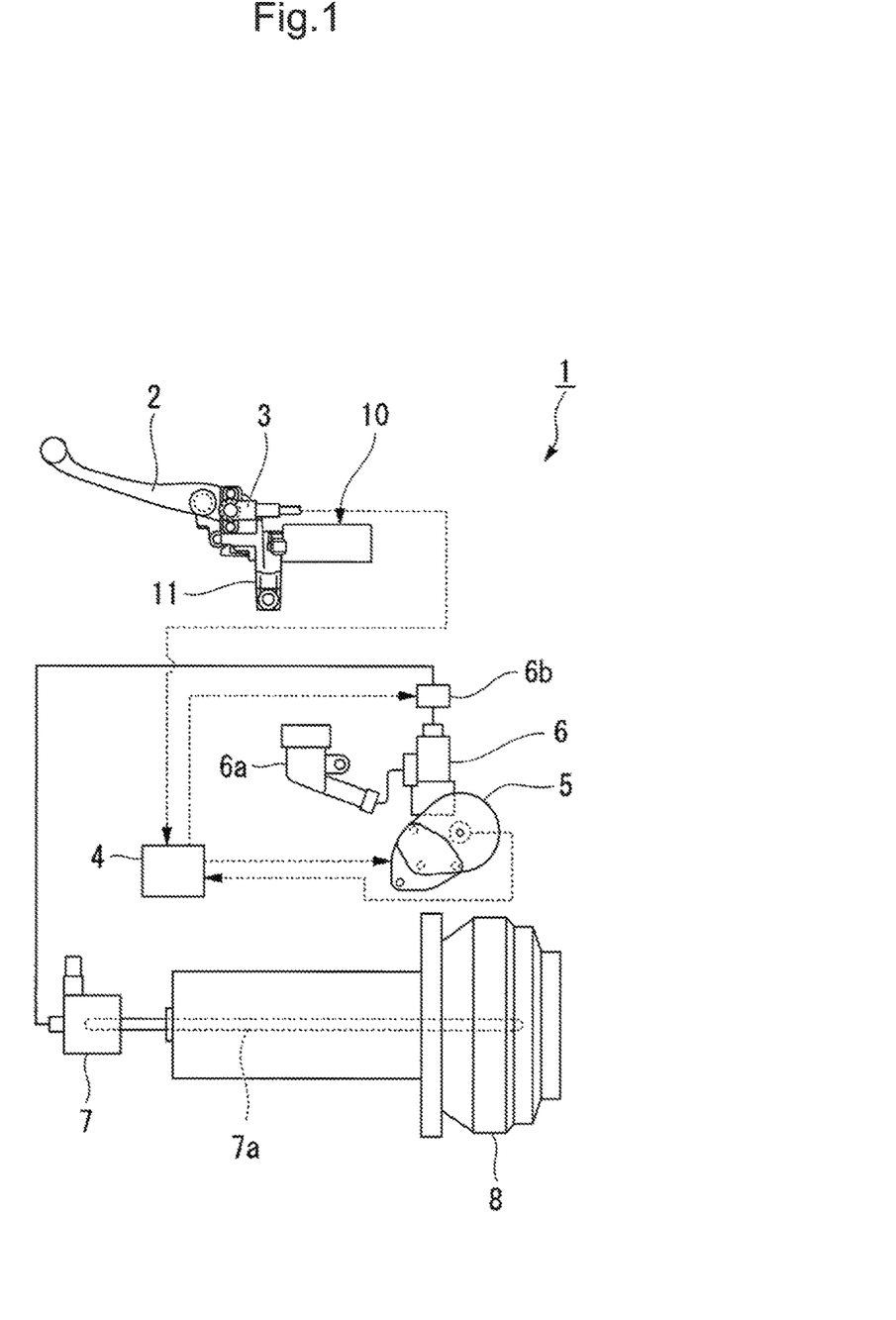
FIG. 1 is a configuration diagram of a clutch control system of a first embodiment of the present application.

As shown in FIG. 1, a clutch control system 1 of the embodiment includes: a clutch lever 2 as a clutch controller of a clutch device 8; a lever angle sensor (operation amount detection means) 3 for electrically detecting an operation amount (rotation angle) of the clutch lever 2; an electronic control unit 4 into which a detected value of the lever angle sensor 3 is inputted; an actuator 5 controlled by the electronic control unit 4 on the basis of the detected value; a master cylinder 6 that generates hydraulic pressure by the driving of the actuator 5; a slave cylinder 7 to which the hydraulic pressure generated by the master cylinder 6 is supplied; and reaction force applying device (reaction force applying means) 10 that applies operation reaction force to the clutch lever 2.

The clutch device 8 is provided between an engine and transmission of a motorcycle, for example. The clutch device 8 switches connection and disconnection of power transmission between the engine and transmission, depending on the axial movement of a push rod 7a which is driven in the axial direction by the slave cylinder 7. The master cylinder 6 to which a reservoir 6a is connected is connected to the slave cylinder 7, through a solenoid on-off valve 6b.

Figure 2:
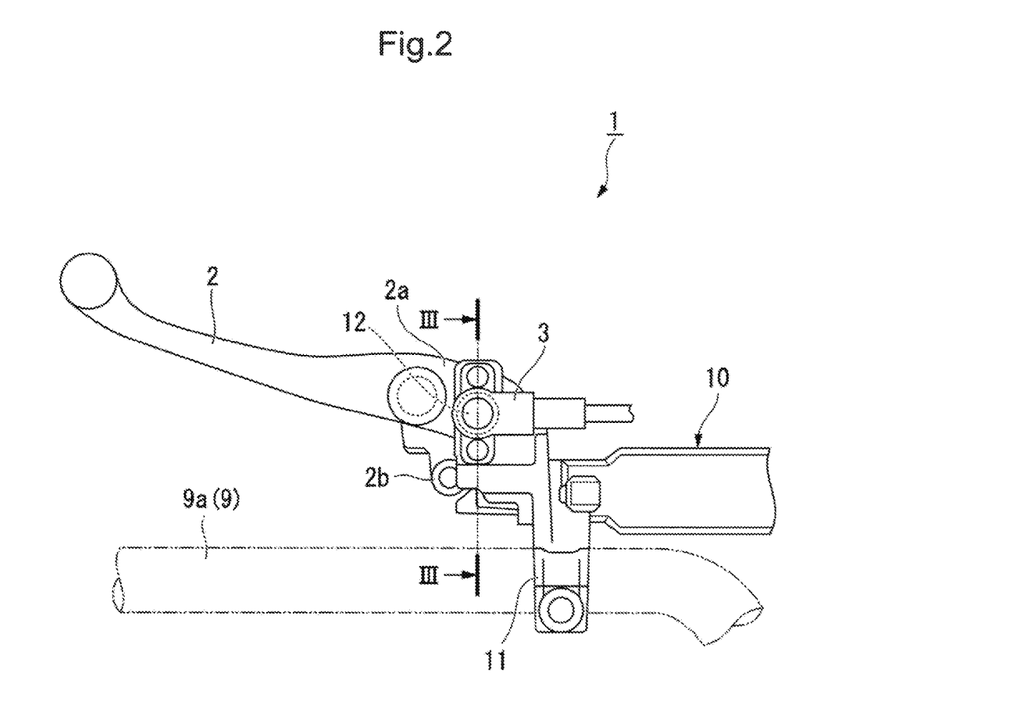
FIG. 2 is a plan view of the periphery of a clutch lever of the aforementioned clutch control system.
Figure 3:
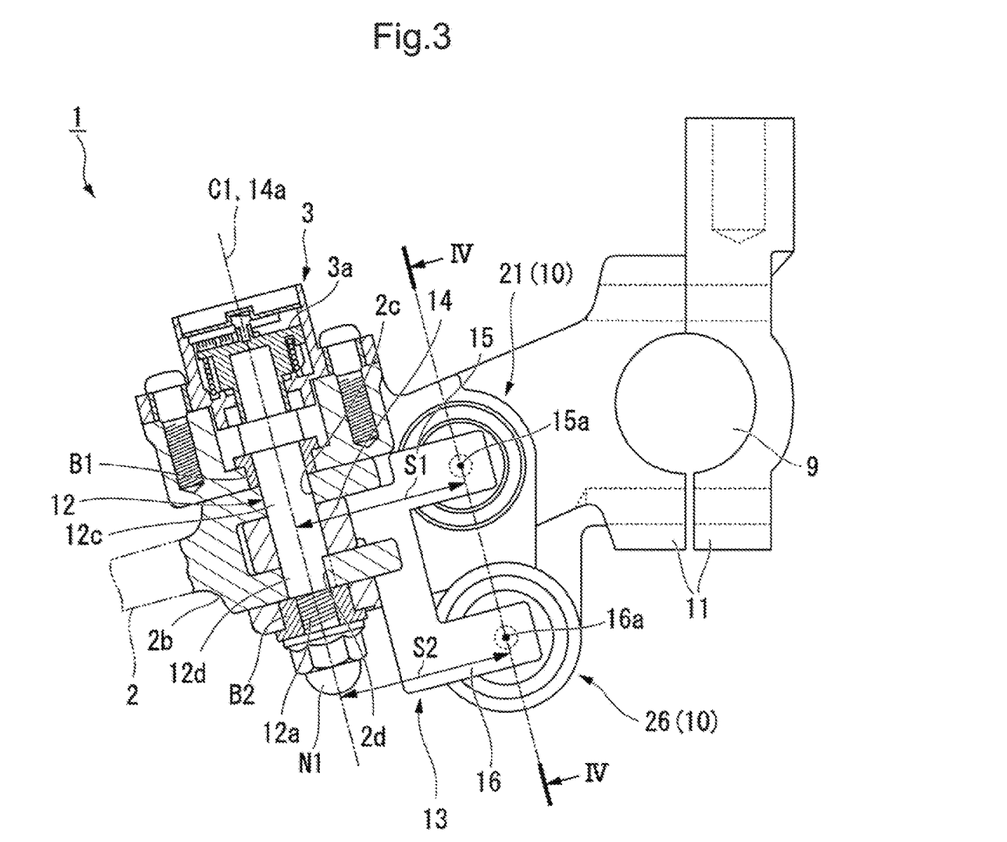
FIG. 3 is a cross-sectional view taken along III-III of FIG. 2.

Also referring to FIGS. 2 and 3, a grip portion 9a to be gripped by the left hand of the rider is provided, on an outer part of a left handlebar 9 of the motorcycle. A lever holder 11 for supporting the clutch lever 2 is attached on an inner part of the handlebar 9. A base portion 2a of the clutch lever 2 is rotatably supported to the lever holder 11, through a lever support shaft 12. An input/output arm 13 for actuating the reaction force applying means 10 is attached to the base portion 2a of the clutch lever 2.

Figure 4:
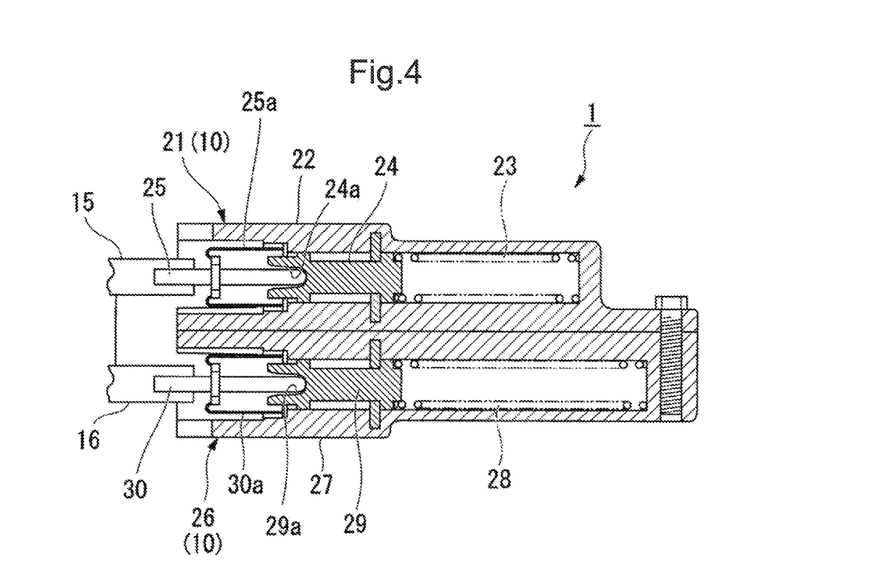
FIG. 4 is a cross-sectional view taken along IV-IV of FIG. 3.

Also referring to FIG. 4, the reaction force applying means 10 includes first and second reaction force generation cylinders 21, 26, which are arranged parallel to each other. The first and second reaction force generation cylinders 21, 26 are arranged parallel to the grip portion 9a, for example. The first and second reaction force generation cylinders 21, 26 extend inward in the vehicle width direction (toward the opposite side of the grip portion 9a) from the lever holder 11. The first and second reaction force generation cylinders 21, 26 are arranged vertically, with the first reaction force generation cylinder 21 on the upper side and the second reaction force generation cylinder 26 on the lower side, and are coupled to each other as one body.

The first reaction force generation cylinder 21 includes: a first cylinder body 22 fixed to the lever holder 11; a first spring 23 accommodated inside the first cylinder body 22 as a reaction force generation source; and a first piston 24 fitted inside the first cylinder body 22 so as to be capable of compressing the first spring 23.

The second reaction force generation cylinder 26 includes: a second cylinder body 27 fixed to the lever holder 11 below the first cylinder body 22; a second spring 28 accommodated inside the second cylinder body 27 as a reaction force generation source; and a second piston 29 fitted inside the second cylinder body 27 so as to be capable of compressing the second spring 28.

The axial length of the first cylinder body 22 is shorter than that of the second cylinder body 27 arranged therebelow. The first and second springs 23, 28 are compression coil springs, and are respectively accommodated inside the first and second cylinder bodies 22, 27 so as to be aligned therewith in the axial direction. As in the case of the axial lengths of the first and second cylinder bodies 22, 27, the axial (expanding and contracting direction) length of the first spring 23 is shorter than that of the second spring 28 arranged therebelow.

Outer end parts of the first and second pistons 24, 29 are visible, from end parts on the outer side in the vehicle width direction (grip portion 9a side) of the first and second cylinder bodies 22, 27. Spherical receiving portions 24a, 29a with which inner end parts of first and second push rods 25, 30 engage in a swingable manner are provided, respectively, on the outer end parts of the first and second pistons 24, 29. Cylinder side-input/output points 15a, 16a of the input/output arm 13, which swing integrally with the clutch lever 2, respectively engage with outer end parts of the first and second push rods 25, 30. Dust boots 25a, 30a are attached between middle parts of the first and second push rods 25, 30 and outer end parts of the first and second cylinder bodies 22, 27, respectively.

An input/output portion 2b, which extends to extended parts of the first and second reaction force generation cylinders 21, 26, is provided in the base portion 2a of the clutch lever 2. The input/output arm 13 capable of rotating integrally with the clutch lever 2 is supported to the input/output portion 2b. Opposite to the side of the input/output portion 2b of the clutch lever 2, the input/output arm 13 branches into upper and lower parts on the side of the outer end parts (input/output parts) of the first and second cylinder bodies 22, 27.

Referring to FIG. 3, of the input/output arm 13, a part that engages with the input/output portion 2b of the clutch lever 2 is a single lever side-arm portion 14, while parts that engage with the first and second push rods 25, 30 are first and second cylinder side-arm portions 15, 16. Arm lengths S1, S2 are the same, that is, the lengths S1, S2 between an input/output point (equivalent to lever side-input/output point 14a, center axis C1 of lever support shaft 12) of the lever side-arm portion 14 for the clutch lever 2, and input/output points (equivalent to first and second cylinder side-input/output points 15a, 16a, shaft centers of outer end parts of first and second push rods 25, 30) of the first and second cylinder side-arm portions 15, 16 for the first and second reaction force generation cylinders 21, 26 are the same.

When the clutch lever 2 is rotated, the first and second cylinder side-arm portions 15, 16 of the input/output arm 13 simultaneously press the first and second push rods 25, 30, to compress the first and second springs 23, 28 inside the first and second cylinder bodies 22, 27 for the same amount. The input/output arm 13 is a unit, and a total force of compressive loads of the first and second springs 23, 28 acts on the clutch lever 2 as operation reaction force.

The lever angle sensor 3 as the operation amount detection means for detecting an operation amount (rotation angle) of the clutch lever 2, is attached above the lever holder 11 on the same axis as the lever support shaft 12. The lever angle sensor 3 is a so-called potentiometer, and its rotation detector 3a is connected coaxially with the lever support shaft 12 so as to be integrally rotatable therewith. The lever support shaft 12 penetrates the lever holder 11 and other parts from above, and is attached by screwing a nut N1 into a screw shaft 12a protruding below the lever holder 11. Upper and lower parts of the lever support shaft 12 are slidably supported to upper and lower parts of the lever holder 11, through bushes B1, B2.

Upper and lower support shaft insertion holes 2c, 2d, through which an upper portion 12c and lower portion 12d of the lever support shaft 12 are inserted, are formed in upper and lower parts of the base portion 2a of the clutch lever 2. While the upper support shaft insertion hole 2c of the base portion 2a is formed into a circular shape, the lower support shaft insertion hole 2d of the base portion 2a is formed into a D shape. The cross-sectional shape of the upper portion 12c of the lever support shaft 12 is formed into a circular shape, which fits with the upper support shaft insertion hole 2c, and the cross-sectional shape of the lower portion 12d of the lever support shaft 12 is formed into a D shape, which fits with the lower support shaft insertion hole 2d. The fitting of the lower portion 12d of the lever support shaft 12 and the lower support shaft insertion hole 2d causes the lever support shaft 12 to rotate integrally with the clutch lever 2. With this, the lever angle sensor 3 can detect a rotation angle (operation amount) of the clutch lever 2. Note that an alternative configuration may be employed in which the lever support shaft 12 does not rotate, while the rotation detector 3a of the lever angle sensor 3 engages with the clutch lever 2 and rotates integrally therewith.

An operation amount, i.e., a rotary operation amount of the clutch lever 2 detected by the lever angle sensor 3, is inputted into the electronic control unit 4. The electronic control unit 4 drives an electric motor of the actuator 5 on the basis of a detected value of the lever angle sensor 3, and causes the master cylinder 6 to generate hydraulic pressure.

Figure 5:
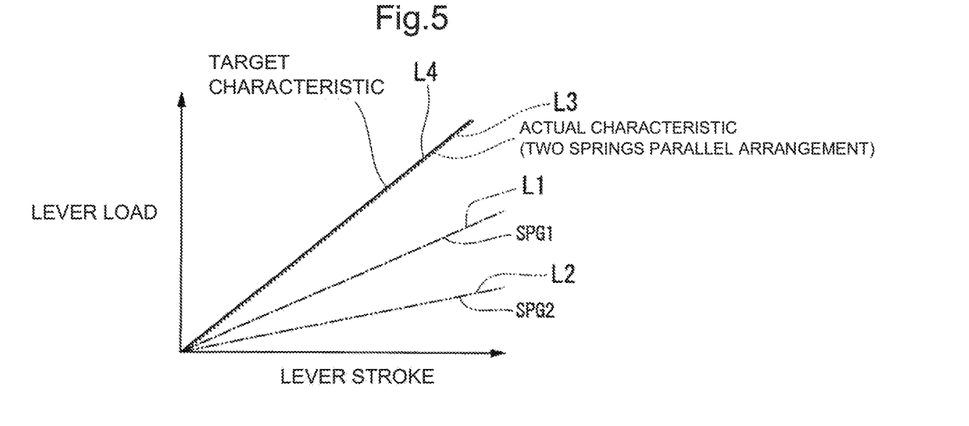
FIG. 5 is a graph showing characteristics of variation in lever load, relative to the lever stroke of the aforementioned clutch lever.

FIG. 5 is a graph showing variation in operation reaction force (lever load) of the reaction force applying means 10 of the embodiment, relative to the operation amount (lever stroke) of the clutch lever 2. In FIG. 5, line L1 is a line indicating operation reaction force of the first spring 23, line L2 is a line indicating operation reaction force of the second spring 28, line L3 is a line indicating combined operation reaction force (actual characteristic) obtained by combining operation reaction forces of the first and second springs 23, 28, and line L4 indicates a target characteristic of operation reaction force of the embodiment. Since the combined operation reaction force increases at a relatively high rate relative to the lever stroke, it can easily reproduce the firm target characteristic, which is similar to that in the conventional configuration where operating force of the clutch lever 2 is transmitted to the clutch device 8 side through hydraulic pressure, cable, or the like. Note that although set loads (initial loads) of the first and second springs 23, 28 are set to "0" or an extremely small value in FIG. 5, these may be set to desired set loads.

Next, the effects will be described.

First, when the clutch lever 2 is operated to disconnect power transmission of the clutch device 8, its operation amount is detected by the lever angle sensor 3, and the electronic control unit 4 drives the actuator 5 on the basis of the detected value. This generates hydraulic pressure in the master cylinder 6, so that the slave cylinder 7 is actuated and disconnects the clutch device 8.

At this time, the reaction force applying means 10 including the two springs 23, 28 gives the operator (rider) a firm sense of operation on the clutch lever 2. In other words, the clutch lever 2 and clutch device 8 are linked electrically in the configuration, and yet the rider is given a sense of operation similar to that of the conventional configuration where the clutch lever 2 and clutch device 8 are linked mechanically by use of hydraulic pressure, cable, or the like. Thus, the operation load characteristic of the clutch lever 2 can be brought closer to a more natural sense of operation, similar to the conventional configuration.

Operation load of the reaction force applying means 10 is set by using the total of spring loads of the first and second springs 23, 28. Here, operation load can be stabilized easily, since the compression coil spring is used, whose reaction force characteristic based on the spring coefficient and free length tends to be stable. Also, since operation load is set by use of the multiple springs 23, 28, operation load can be set more freely, and since the multiple springs 23, 28 are arranged parallel to each other, radial and axial enlargement can be suppressed as compared to a case of using a large-diameter or long spring, so that influence on layout of peripheral parts can be suppressed. Also, since the first and second cylinder bodies 22, 27 having different lengths are arranged parallel to each other, the reaction force applying means 10 can be arranged even more freely, and its periphery can be downsized.

Further, since the reaction force applying means 10 is formed by combining the cylinder body and piston, the conventional master cylinder and piston utilizing hydraulic pressure, lever holder 11, input/output arm 13, push rods 25, 30, and other parts can be used to configure the reaction force applying means 10. Hence, cost can be reduced as compared to a case of using only dedicated parts.

As has been described, the clutch control system 1 of the above embodiment includes: the clutch device 8; the clutch lever 2 as the controller of the clutch device 8; the actuator 5 for driving the clutch device 8 according to operation of the clutch lever 2; the lever angle sensor 3 for detecting an operation amount of the clutch lever 2; and the electronic control unit 4 for controlling operation of the actuator 5 on the basis of a detected value of the lever angle sensor 3. The clutch lever 2 is rotatable around the lever support shaft 12; the reaction force applying means 10, which uses the springs 23, 28 as the reaction force generation source, applies operation reaction force to the clutch lever 2; the reaction force applying means 10 includes multiple reaction force generation cylinders 21, 26 arranged parallel to one another; and the clutch lever 2 has the input/output arm 13, which extends toward the input/output part of each of the multiple reaction force generation cylinders 21, 26 from the vicinity of the lever support shaft 12, to allow transmission of operating force and reaction force between the clutch lever 2 and the reaction force applying means 10.

According to this configuration, in a system where the clutch lever 2 and clutch device 8 are linked electrically, multiple reaction force generation cylinders 21, 26 are provided parallel to each other to create an operation load of the clutch device 8 on the clutch lever 2. Hence, the reaction force applying means 10 can be arranged more freely to downsize the periphery thereof, and a larger operation load can be generated.

That is, the periphery of the reaction force applying means 10 of the clutch lever 2 can be downsized, and operation load can be set more freely.

Also, in the above clutch control system 1, the clutch lever 2 is attached to the front of a handlebar 9 of the vehicle by a clamp-type lever holder 11; and the reaction force generation cylinders 21, 26 are provided in an upper and lower pair in front of the handlebar 9.

According to this configuration, since the reaction force applying means 10 including the upper and lower pair of reaction force generation cylinders 21, 26 is arranged in front of the handlebar 9 with the clutch lever 2, the reaction force applying means 10 is not arranged on the rear side (rider's side) of the handlebar 9, and also, on the front side of the handlebar 9, frontward projection of the reaction force applying means 10 is suppressed, so that interference with peripheral parts can be prevented and freedom in arrangement can be ensured.

Also, in the above clutch control system 1, the input/output arm 13 has the lever side-input/output point 14a for the clutch lever 2, and the multiple cylinder side-input/output points 15a, 16a for the reaction force generation cylinders 21, 26; and the arm lengths S1, S2 between the lever side-input/output point 14a and each of the cylinder side-input/output points 15a, 16a are the same.

According to this configuration, when transmitting power between the clutch lever 2 and reaction force applying means 10 through the input/output arm 13, the power can be inputted and outputted at the same lever ratio between the clutch lever 2 and each of the reaction force generation cylinders 21, 26, whereby load of the reaction force applying means 10 can be set easily.

Also, in the above clutch control system 1, the reaction force generation cylinders 21, 26 respectively have the cylinder bodies 22, 27 accommodating the springs 23, 28; the springs 23, 28 are coil springs expanding and contracting in the axial direction of the cylinder bodies 22, 27; and of the multiple reaction force generation cylinders 21, 26, the cylinder body 22 and spring 23 of the upper reaction force generation cylinder 21 have shorter axial lengths than the cylinder body 27 and spring 28 of the lower reaction force generation cylinder 26.

According to this configuration, since the upper reaction force generation cylinder 21 closer to the rider is formed shorter, the reaction force applying means 10 can be made less recognizable while setting a large operation load.

Also, in the above clutch control system 1, the lever angle sensor 3 is a potentiometer arranged coaxially with the lever support shaft 12; the rotation detector 3a of the lever angle sensor 3 is connected so as to be integrally rotatable with the lever support shaft 12; and the lever support shaft 12 is connected so as to be integrally rotatable with the clutch lever 2.

According to this configuration, since the lever support shaft 12 is used as the shaft member continuous with the rotation detector 3a of the potentiometer, and the lever support shaft 12 is integrally rotatable with the clutch lever 2, the potentiometer can directly acquire the rotation angle of the clutch lever 2.

Figure 6:
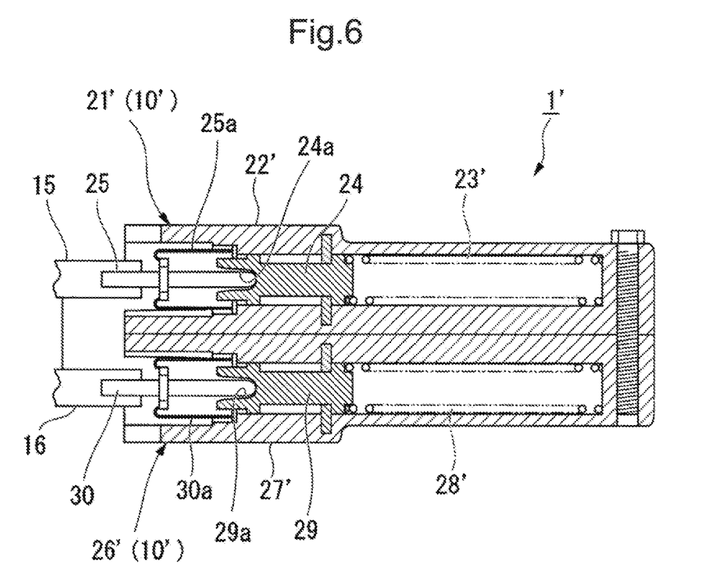
FIG. 6 is a cross-sectional view corresponding to FIG. 4, which shows a modified example of reaction force applying means of the aforementioned clutch lever.

FIG. 6 shows a modified example of the above embodiment. A clutch control system 1' of the modified example is particularly different from the above clutch control system 1, in that instead of the reaction force applying means 10, it uses reaction force applying means 10', which includes an upper and lower pair of first and second reaction force generation cylinders 21', 26' including first and second cylinder bodies 22', 27' as well as first and second coil springs 23', 28' having the same axial lengths.

In this case, since the same loads are generated in the reaction force generation cylinders 21', 26', operation load can be set even easier, and cost can be reduced by part sharing.

Second Embodiment

Figure 7:
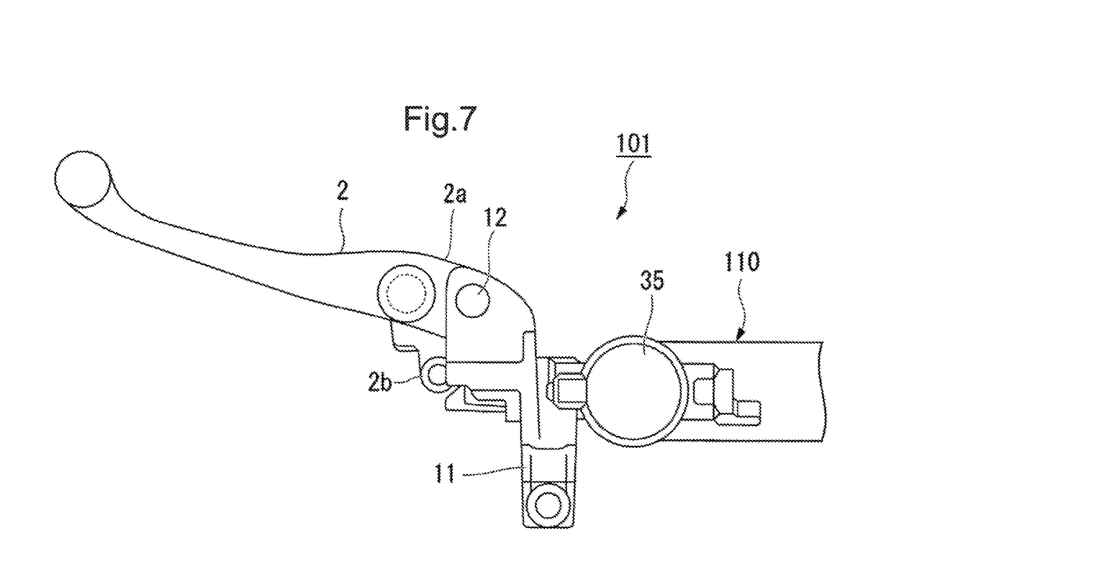
FIG. 7 is a plan view corresponding to FIG. 2, which shows a clutch control system of a second embodiment of the present application.
Figure 8:
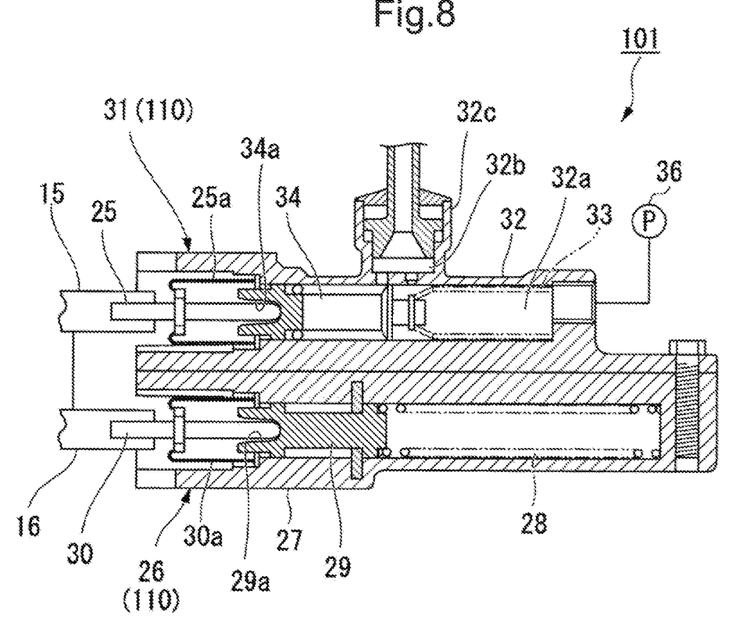
FIG. 8 is a cross-sectional view of the second embodiment corresponding to FIG. 4.

Next, a second embodiment of the present application will be described with reference to FIGS. 7 and 8.

A clutch control system 101 of the embodiment is particularly different from the aforementioned first embodiment, in that instead of one of the first and second reaction force generation cylinders 21, 26 (instead of the upper first reaction force generation cylinder 21 in this embodiment), it uses reaction force applying means 110, which includes a third reaction force generation cylinder 31 capable of generating hydraulic pressure according to the operation amount of a clutch lever 2. Other configurations which are the same as the aforementioned embodiment are assigned the same reference numerals, and detailed descriptions thereof are omitted.

The third reaction force generation cylinder 31 includes a third cylinder body 32 fixed to a lever holder 11, a third spring 33 as a compression coil spring accommodated inside the third cylinder body 32 as a reaction force generation source, and a third piston 34 fitted into the third cylinder body 32 so as to be capable of compressing the third spring 33. A first push rod 25 engages with a spherical receiving portion 34a on an outer end part of the third piston 34.

An oil branching portion 32c, which communicates into an oil chamber 32a inside the third cylinder body 32 through a connection hole 32b, is provided on a side part of the third cylinder body 32. A reservoir tank 35, which can accommodate part of oil (hydraulic fluid) inside the third cylinder body 32 when operating the clutch lever 2, is connected to the oil branching portion 32c.

Instead of the lever angle sensor 3 as the potentiometer, the embodiment uses a hydraulic pressure sensor 36 for detecting hydraulic pressure generated by the third reaction force generation cylinder 31, as operation amount detection means of the clutch lever 2. The hydraulic pressure sensor 36 is connected to the oil chamber 32a inside the cylinder, for example. Note that the hydraulic pressure sensor 36 may be connected to the connection hole 32b that communicates into the oil chamber 32a.

According to this embodiment, the third reaction force generation cylinder 31 capable of generating hydraulic pressure according to the operation amount of the clutch lever 2 is included, and the operation amount of the clutch lever 2 is detected by detecting the hydraulic pressure generated by the third reaction force generation cylinder 31. Hence, cost can be reduced by eliminating the expensive potentiometer, and also the operation characteristic felt on the hand can be brought closer to that of the conventional configuration, using hydraulic pressure.

Third Embodiment

Figure 9:
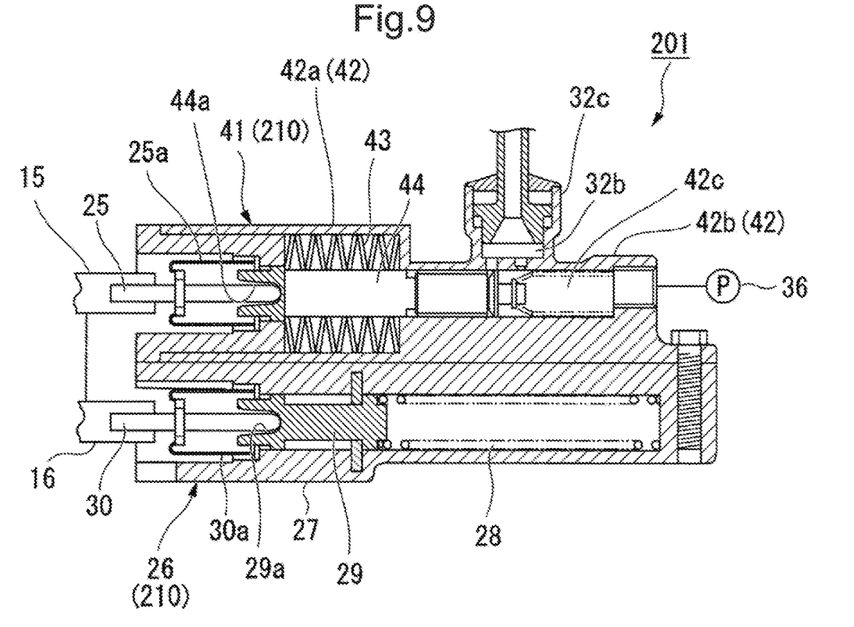
FIG. 9 is a cross-sectional view corresponding to FIG. 4, which shows a clutch control system of a third embodiment of the present application.

Next, a third embodiment of the present application will be described with reference to FIGS. 9 and 10.

A clutch control system 201 of the embodiment is particularly different from the aforementioned first embodiment, in that instead of one of the first and second reaction force generation cylinders 21, 26 accommodating coil springs as reaction force generation sources (instead of the upper first reaction force generation cylinder 21 in this embodiment), it uses reaction force applying means 210, which includes a fourth spring 43 that is a Belleville spring (diaphragm spring) as a reaction force generation source, and includes a fourth reaction force generation cylinder 41 accommodating the fourth spring 43. Other configurations which are the same as the aforementioned embodiment are assigned the same reference numerals, and detailed descriptions thereof are omitted.

In place of the third reaction force generation cylinder 31 of the second embodiment that generates hydraulic pressure, the fourth reaction force generation cylinder 41 uses multiple Belleville springs stacked in a staggered manner instead of the coil spring, as the fourth spring 43. The fourth reaction force generation cylinder 41 includes a fourth cylinder body 42 fixed to a lever holder 11, the fourth spring 43 accommodated inside the fourth cylinder body 42 as a reaction force generation source, and a fourth piston 44 fitted into the fourth cylinder body 42 so as to be capable of compressing the fourth spring 43. A first push rod 25 engages with a spherical receiving portion 44a on an outer end part of the fourth piston 44.

The fourth cylinder body 42 is provided such that its outer portion 42a has a larger diameter than its inner portion 42b. The fourth spring 43 is accommodated inside the outer portion 42a, while an oil chamber 42c is provided inside the inner portion 42b. A hydraulic pressure sensor 36 is connected to the oil chamber 42c.

Note that a configuration may be employed in which, a Belleville spring instead of a coil spring is accommodated as a reaction force generation source, in the reaction force generation cylinder that does not generate hydraulic pressure.

Figure 10:
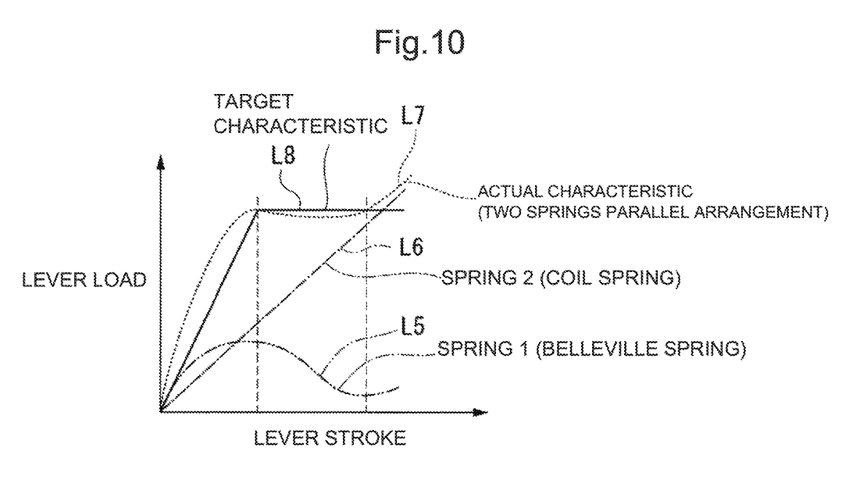
FIG. 10 is a graph of the third embodiment corresponding to FIG. 5.

FIG. 10 is a graph showing variation in operation reaction force (lever load) of the reaction force applying means 210 of the embodiment, relative to the operation amount (lever stroke) of the clutch lever 2. In FIG. 10, line L5 is a line indicating operation reaction force of the Belleville spring (fourth spring 43), line L6 is a line indicating operation reaction force of the coil spring (second spring 28), line L7 is a line indicating combined operation reaction force (actual characteristic) obtained by combining operation reaction forces of the coil spring and the Belleville spring, and line L8 indicates a target characteristic of operation reaction force of the embodiment. While the operation reaction force of the coil spring increases linearly in proportion to the increase in the lever stroke, the operation reaction force of the Belleville spring varies in a curved line. To be specific, although the operation reaction force of the Belleville spring increases more drastically than that of the coil spring when the lever stroke is small, the rate of increase in the operation reaction force thereafter decreases, and eventually the operation reaction force starts to decrease relative to the increase in the lever stroke. Then, the operation reaction force starts to increase again near the end of the lever stroke. The combination of these operation reaction forces can easily reproduce a characteristic similar to the target characteristic, in which the lever load is varied in stages.

According to this embodiment, since the Belleville spring is used in one reaction force generation cylinder 41 of the upper and lower pair of reaction force generation cylinders 21, 41, the axial length of the one reaction force generation cylinder 41 can be suppressed for downsizing, and since the coil spring is used in the other reaction force generation cylinder 21, combination of the linear load characteristic of the coil spring and the nonlinear load characteristic of the Belleville spring can bring the load characteristic closer to that of the conventional configuration, which varies in stages.

Note that the present invention is not limited to the above embodiments, and the reaction force generation cylinder is not limited to being arranged parallel to the handlebar (grip portion), but may be arranged so as to intersect with the handlebar, for example. A configuration may be employed in which the lower reaction force generation cylinder is shorter than the upper reaction force generation cylinder. A stroke simulator may be connected to a reaction force generation cylinder that generates hydraulic pressure.

Also, the configurations of the above embodiments are only examples of the present invention, and various modifications can be made without departing from the gist of the invention, such as replacing a component of the embodiment with a known component.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A clutch control apparatus comprising:
a clutch device;
a clutch controller as a controller of said clutch device;
an actuator for driving said clutch device according to operation of said clutch controller;
operation amount detector to detect an operation amount of said clutch controller; and
an electronic control unit configured to control operation of said actuator on the basis of a detected value of said operation amount detector, wherein:
said clutch controller is a clutch lever supported so as to be rotatable about a rotary shaft,
the clutch control apparatus further comprises a reaction force applying device configured to apply operation reaction force to said clutch lever, the reaction force applying device including a spring as a reaction force generation source,
said reaction force applying device includes a plurality of reaction force generation cylinders arranged parallel to one another;
each of said plurality of reaction force generation cylinders includes a cylinder body accommodating a spring,
each of the springs of said plurality of reaction force generation cylinders has a different load characteristic from one another, and
said clutch lever includes an input/output arm extending from the vicinity of said rotary shaft toward an input/output part of each of said plurality of reaction force generation cylinders, to allow transmission of operating force and reaction force between said clutch lever and said reaction force applying device,
wherein:
said clutch lever is attached in front of a handlebar of a vehicle by a clamp-type lever holder; and
said plurality of reaction force generation cylinders are provided in the front of said handlebar and includes an upper cylinder and a lower cylinder, the upper cylinder being located above the lower cylinder.

2. The clutch control apparatus according to claim 1, wherein:
said input/output arm has a lever side-input/output point for input and output with respect to said clutch lever, and a plurality of cylinder side-input/output points for input and output with respect to the respective reaction force generation cylinders, and
respective arm lengths from said lever side-input/output point to the respective cylinder side-input/output points are equal to one another.

3. The clutch control apparatus according to claim 1, wherein:
said spring is a coil spring expanding and contracting in the axial direction of the respective cylinder bodies, and
of said plurality of reaction force generation cylinders, the cylinder body and the spring of the upper cylinder have shorter axial lengths than the axial lengths of the cylinder body and the spring of the lower cylinder.

4. The clutch control apparatus according to claim 1, wherein:
said spring is a coil spring expanding and contracting in the axial direction of the respective cylinder bodies, and
the cylinder bodies of the respective reaction force generation cylinders have the same lengths in the axial direction, and the springs of the respective reaction force generation cylinders have the same lengths in the axial direction.

5. The clutch control apparatus according to claim 1, wherein:
the spring of one of the reaction force generation cylinders is a coil spring, and
the spring of the other of the reaction force generation cylinders is a Belleville spring.

6. The clutch control apparatus according to claim 1, wherein:
said operation amount detector is a potentiometer arranged coaxially with said rotary shaft,
a rotation detector of said potentiometer is connected to the rotary shaft so as to be integrally rotatable with said rotary shaft, and
said rotary shaft is connected to the clutch lever so as to be integrally rotatable with said clutch lever.

7. The clutch control apparatus according to claim 1, wherein:
at least one of said plurality of reaction force generation cylinders includes
a piston accommodated in a retractable manner inside said cylinder body, and
an oil chamber formed inside said cylinder body and closed by said piston, and
said operation amount detector is a hydraulic pressure sensor detecting hydraulic pressure of oil filled in said oil chamber, the hydraulic pressure sensor detecting hydraulic pressure generated by frontward and backward movement of said piston caused by operation of said clutch lever.

8. The clutch control apparatus according to claim 7, wherein:
an oil branching portion is provided at a longitudinal intermediate portion of said cylinder body,
said oil branching portion communicates into said oil chamber through a communication hole, and
said hydraulic pressure sensor is provided in said communication hole.

9. The clutch control apparatus according to claim 7, wherein said hydraulic pressure sensor is provided in said oil chamber.

10. The clutch control apparatus according to claim 2, wherein said plurality of reaction force generation cylinders extend in a width direction of the vehicle.

11. A clutch control apparatus comprising:
a clutch lever supported so as to be rotatable about a rotary shaft;
operation amount detector to detect an operation amount of said clutch lever; and
a reaction force applying device configured to apply operation reaction force to said clutch lever, the reaction force applying device including a spring as a reaction force generation source,
wherein said reaction force applying device includes a plurality of reaction force generation cylinders arranged parallel to one another,
each of said plurality of reaction force generation cylinders includes a cylinder body accommodating a spring,
each of the springs of said plurality of reaction force generation cylinders has a different load characteristic from one another, and
said clutch lever includes an input/output arm extending from the vicinity of said rotary shaft toward an input/output part of each of said plurality of reaction force generation cylinders, to allow transmission of operating force and reaction force between said clutch lever and said reaction force applying device,
wherein:
said clutch lever is attached in front of a handlebar of a vehicle by a clamp-type lever holder; and
said plurality of reaction force generation cylinders are provided in the front of said handlebar and includes an upper cylinder and a lower cylinder, the upper cylinder being located above the lower cylinder.

12. A clutch control apparatus comprising:
a clutch device;
a clutch controller as a controller of said clutch device;
an actuator for driving said clutch device according to operation of said clutch controller;
operation amount detector to detect an operation amount of said clutch controller; and
an electronic control unit configured to control operation of said actuator on the basis of a detected value of said operation amount detector, wherein:
said clutch controller is a clutch lever supported so as to be rotatable about a rotary shaft,
the clutch control apparatus further comprises a reaction force applying device configured to apply operation reaction force to said clutch lever, the reaction force applying device including a spring as a reaction force generation source,
said reaction force applying device includes a plurality of reaction force generation cylinders arranged parallel to one another;
each of said plurality of reaction force generation cylinders includes a cylinder body accommodating a spring,
each of the springs of said plurality of reaction force generation cylinders has a different load characteristic from one another, and
said clutch lever includes an input/output arm extending from the vicinity of said rotary shaft toward an input/output part of each of said plurality of reaction force generation cylinders, to allow transmission of operating force and reaction force between said clutch lever and said reaction force applying device,
wherein:
said input/output arm has a lever side-input/output point for input and output with respect to said clutch lever, and a plurality of cylinder side-input/output points for input and output with respect to the respective reaction force generation cylinders, and
respective arm lengths from said lever side-input/output point to the respective cylinder side-input/output points are equal to one another.

13. A clutch control apparatus comprising:
a clutch device;
a clutch controller as a controller of said clutch device;
an actuator for driving said clutch device according to operation of said clutch controller;
operation amount detector to detect an operation amount of said clutch controller; and
an electronic control unit configured to control operation of said actuator on the basis of a detected value of said operation amount detector, wherein:
said clutch controller is a clutch lever supported so as to be rotatable about a rotary shaft,
the clutch control apparatus further comprises a reaction force applying device configured to apply operation reaction force to said clutch lever, the reaction force applying device including a spring as a reaction force generation source,
said reaction force applying device includes a plurality of reaction force generation cylinders arranged parallel to one another;
each of said plurality of reaction force generation cylinders includes a cylinder body accommodating a spring,
each of the springs of said plurality of reaction force generation cylinders has a different load characteristic from one another, and
said clutch lever includes an input/output arm extending from the vicinity of said rotary shaft toward an input/output part of each of said plurality of reaction force generation cylinders, to allow transmission of operating force and reaction force between said clutch lever and said reaction force applying device,
wherein:
at least one of said plurality of reaction force generation cylinders includes
a piston accommodated in a retractable manner inside said cylinder body, and
an oil chamber formed inside said cylinder body and closed by said piston, and
said operation amount detector is a hydraulic pressure sensor detecting hydraulic pressure of oil filled in said oil chamber, the hydraulic pressure sensor detecting hydraulic pressure generated by frontward and backward movement of said piston caused by operation of said clutch lever.

14. The clutch control apparatus according to claim 13, wherein:
an oil branching portion is provided at a longitudinal intermediate portion of said cylinder body,
said oil branching portion communicates into said oil chamber through a communication hole, and
said hydraulic pressure sensor is provided in said communication hole.

15. The clutch control apparatus according to claim 13, wherein
said hydraulic pressure sensor is provided in said oil chamber.

* * * * *